United States Patent
Stephens (10) Patent No.: US 8,714,873 B2
(45) Date of Patent: May 6, 2014

(54) APPARATUS AND METHOD FOR APPLYING ADDITIVES TO A CONCRETE MIX

(76) Inventor: John Scott Stephens, Lubbock, TX (US)

( * ) Notice: Subject to any disclaimer, the term of this patent is extended or adjusted under 35 U.S.C. 154(b) by 50 days.

(21) Appl. No.: 13/461,362

(22) Filed: May 1, 2012

(65) Prior Publication Data

US 2013/0223929 A1   Aug. 29, 2013

Related U.S. Application Data

(63) Continuation-in-part of application No. 12/794,848, filed on Jun. 7, 2010.

(51) Int. Cl.
*E01C 19/22* (2006.01)
*E01C 19/38* (2006.01)

(52) U.S. Cl.
USPC .......................................... 404/118; 404/102

(58) Field of Classification Search
USPC ........... 404/112–114, 118, 120, 124, 75, 102; 15/234.5
See application file for complete search history.

(56) References Cited

U.S. PATENT DOCUMENTS

| | | | | |
|---|---|---|---|---|
| 2,633,782 A | * | 4/1953 | Clement | 404/133.1 |
| 2,737,094 A | * | 3/1956 | Jackson | 404/113 |
| 3,458,885 A | * | 8/1969 | Danielsson | 15/50.1 |
| 3,515,043 A | * | 6/1970 | Austin | 404/113 |
| 3,621,086 A | | 11/1971 | Guide | |
| 4,185,431 A | | 1/1980 | Brownlee | |
| 4,265,609 A | | 5/1981 | Kitahara | |
| 4,315,700 A | * | 2/1982 | Heiligtag et al. | 404/111 |
| 4,507,015 A | | 3/1985 | Furukawa | |
| 4,591,291 A | | 5/1986 | Owens | |
| 4,641,995 A | * | 2/1987 | Owens | 404/118 |
| 5,024,384 A | * | 6/1991 | Redmon et al. | 239/289 |
| 5,160,034 A | | 11/1992 | Potter | |
| 5,251,998 A | * | 10/1993 | Laditka | 404/75 |
| 5,417,517 A | * | 5/1995 | Zollers | 404/113 |
| 5,855,958 A | | 1/1999 | Nash | |
| 6,824,604 B1 | | 11/2004 | Noack | |
| 6,923,595 B1 | | 8/2005 | Chek | |
| 7,104,724 B2 | * | 9/2006 | Terry | 404/110 |
| 7,195,424 B2 | | 3/2007 | Lindley | |
| 7,270,469 B2 | | 9/2007 | Goode | |
| 7,572,048 B2 | | 8/2009 | Morey | |
| 7,686,538 B2 | | 3/2010 | Lutz | |

(Continued)

FOREIGN PATENT DOCUMENTS

JP            55096454            7/1980

*Primary Examiner* — Thomas B Will
*Assistant Examiner* — Abigail A Risic
(74) *Attorney, Agent, or Firm* — Scott L. Harper; Harper Washam LLP (57) ABSTRACT

The apparatus and method comprise a concrete float with a vibratory additive broadcaster assembly attached therewith. The broadcaster assembly is suspended above the plane of the finishing tool with a vibratory source attached. The broadcaster assembly is filled with an additive and the apparatus is placed on a wet, concrete surface that is to be treated and finished, by a user. Actuation of a power switch by the user activates the vibratory source resulting in the substantial broadcast of additive on to the concrete surface at the desired location(s) on the slab as determined by the user. Vibration damper devices are utilized to minimize the vibrations experienced by the float. The additive is integrated into the concrete or other wet surface by passage of the float over the surface being treated.

11 Claims, 6 Drawing Sheets

(56) References Cited

U.S. PATENT DOCUMENTS

2006/0105161 A1  5/2006  Brandenburger
2007/0234679 A1  10/2007  Metten
2009/0042044 A1  2/2009  Abecassis
2010/0239368 A1  9/2010  Lickel

* cited by examiner

APPARATUS AND METHOD FOR APPLYING ADDITIVES TO A CONCRETE MIX

CROSS-REFERENCE TO RELATED APPLICATIONS

This application is a continuation-in-part of U.S. patent application Ser. No. 12/794,848, which was filed on Jun. 7, 2010.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The present invention relates in general to concrete and masonry construction, and, more particularly, to an apparatus and method for introducing pigments, colorants and other additives to the surface of plastic concrete.

2. Description of Related Art

Concrete can be molded into a variety of shapes and configurations including driveways, decks, concrete masonry units (CMU), blocks, beams, columns, decorative stones, mosaics and facades as examples of decorative concrete applications. Many of these products include a colorant or pigment that provides color to the application. Concrete additives such as plasticizers, pigments, colorants, or dispersants are added to concrete mixes in order to increase the plasticity of the concrete, which improves the workability of the concrete prior to hardening. Color pigments may be added to concrete mix in order to produce a certain color for aesthetic enhancement of the concrete.

The addition of concrete pigment and other admixtures or additives to concrete mix is known in the art. For example, U.S. Pat. No. 7,270,469 discloses an apparatus and method for adding pigmentation to a concrete mix by using a pigmentation dispenser with a hopper and two rotors wherein the pigment is dispensed onto concrete mix traveling on a conveyor. The concrete mix and dispensed pigment are then conveyed to a mixer, which mixes them together. However, such methods require the addition of pigment to the entire batch of concrete to be mixed resulting in a monolithic coloring of the entire concrete mixture, some of which will never be seen or viewed as certain of the concrete structure surfaces after finishing will face the ground or other structures and remain hidden from view. As a result, there is a certain waste volume of pigment generated in such mixing and coloring regimes. Likewise, if a deeper color is required, then the entire batch of colored concrete must be reintroduced to the coloring and mixing system again resulting in the additional waste of colorant to color then entire batch of concrete to be manipulated into a slab, façade, or CMU. Moreover, these methods of adding color hardeners or additives to a concrete mix or slab are performed prior to finishing or shaping of the concrete, thereby increasing the time required to complete the process or project.

The addition of color additives to cast in place concrete has traditionally been by hand. As a plastic concrete slab is being finished, a worker will take a handful of powderized color hardener and disperse it over the slab, in effect flinging a handful of dry color hardener powder into the air, which disperses and falls by gravity on to the wet or plastic concrete surface. A color hardener is a powder that is applied to the surface of plastic, cast in place concrete. It colors the concrete and acts to "harden" the concrete slab.

This method of color hardener application has serious drawbacks. For example, the color hardener powder is dispersed erratically in an uncontrolled amount and in variable concentration on to the concrete slab, which can result in a non-uniform color. Depending on prevailing environmental conditions (e.g. wind), a substantial amount of the color hardener is dispersed and deposited on other surfaces close to the slab and goes to waste, as well as potentially bleeding color undesirably on other surfaces. A more serious drawback is that the powder can be inhaled by the worker and other workers on the site, leading to possible detrimental physiological effects (sneezing, asthma or other undesirable health conditions). As a result, a need exists for an apparatus and method that effectively and safely broadcasts concrete color hardener or other additives on to a plastic cast in place slab.

Therefore, one object of the present invention is to provide an apparatus and method for the controlled dispensation and application of concrete colorants or additives to concrete surfaces without the need to monolithically mix such colorants or additives prior to finishing or manipulation of the concrete into the desired shape or structure.

A further object of the present invention is provide an apparatus and method which provides a mechanism by which pigments or other additives may be introduced to the concrete mixture in specific areas in the discretion of the operator as the concrete is being finished.

A further object of the present invention is the provision of an apparatus and method for introducing color hardener or other additives to concrete mix which is efficient in operation and conserves the volume of additive required to complete the concrete treatment process.

BRIEF SUMMARY OF THE INVENTION

The invention described herein may be envisioned in multiple embodiments and configurations. In summary, one embodiment is an apparatus comprising: a broadcaster device including a vibratory source attached thereto, the broadcaster device attached to a float plate such that the horizontal plane of the lowermost surface of the broadcaster is positioned above the horizontal plane of the lowermost surface of the float plate, wherein the float plate is operable to move in any direction along a horizontal surface in contact with the lowermost surface of the float plate, and wherein the broadcaster device is operable to dispense from the broadcaster device an additive substantially contained thereon upon actuation of the vibratory source.

Another embodiment is an apparatus comprising: a float plate including at least one tool receiver for accepting a tool whereby an operator may impart a pushing or pulling force upon the float plate to effect movement of the float plate upon a surface; a broadcaster device including a vibratory source attached thereto, the broadcaster device attached to the float plate, wherein the broadcaster device is operable to dispense from the broadcaster device an additive substantially contained thereon upon actuation of the vibratory source.

Another embodiment is a method having steps comprising: suspending a broadcaster device above a horizontal surface using a float plate in contact with the horizontal surface, the broadcaster device containing a quantity of additive for dispensing therefrom; vibrating the broadcaster device to dispense the additive onto the horizontal surface; and moving the broadcaster device forward or backward over the horizontal surface to effect additive coverage thereof.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

The above figures are provided for the purpose of illustration and description only, and are not intended to define the limits of the disclosed invention. Use of the same reference number in multiple figures is intended to designate the same or similar parts. Furthermore, when the terms "top," "bottom," "first," "second," "upper," "lower," "height," "width," "length," "end," "side," "horizontal," "vertical," and similar terms are used herein, it should be understood that these terms have reference only to the structure shown in the drawing and are utilized only to facilitate describing the particular embodiment. The extension of the figures with respect to number, position, relationship, and dimensions of the parts to form the preferred embodiment will be explained or will be within the skill of the art after the following teachings of the present invention have been read and understood.

DETAILED DESCRIPTION OF THE INVENTION

For purposes of teaching and discussion, it is useful to provide some overview as to the way in which the invention disclosed herein operates. The following information may be viewed as a basis from which the present invention may by properly explained. Such information is offered for purposes of explanation only and, accordingly, should not be construed to limit the broad scope of the present invention and its potential applications.

Figure 1:
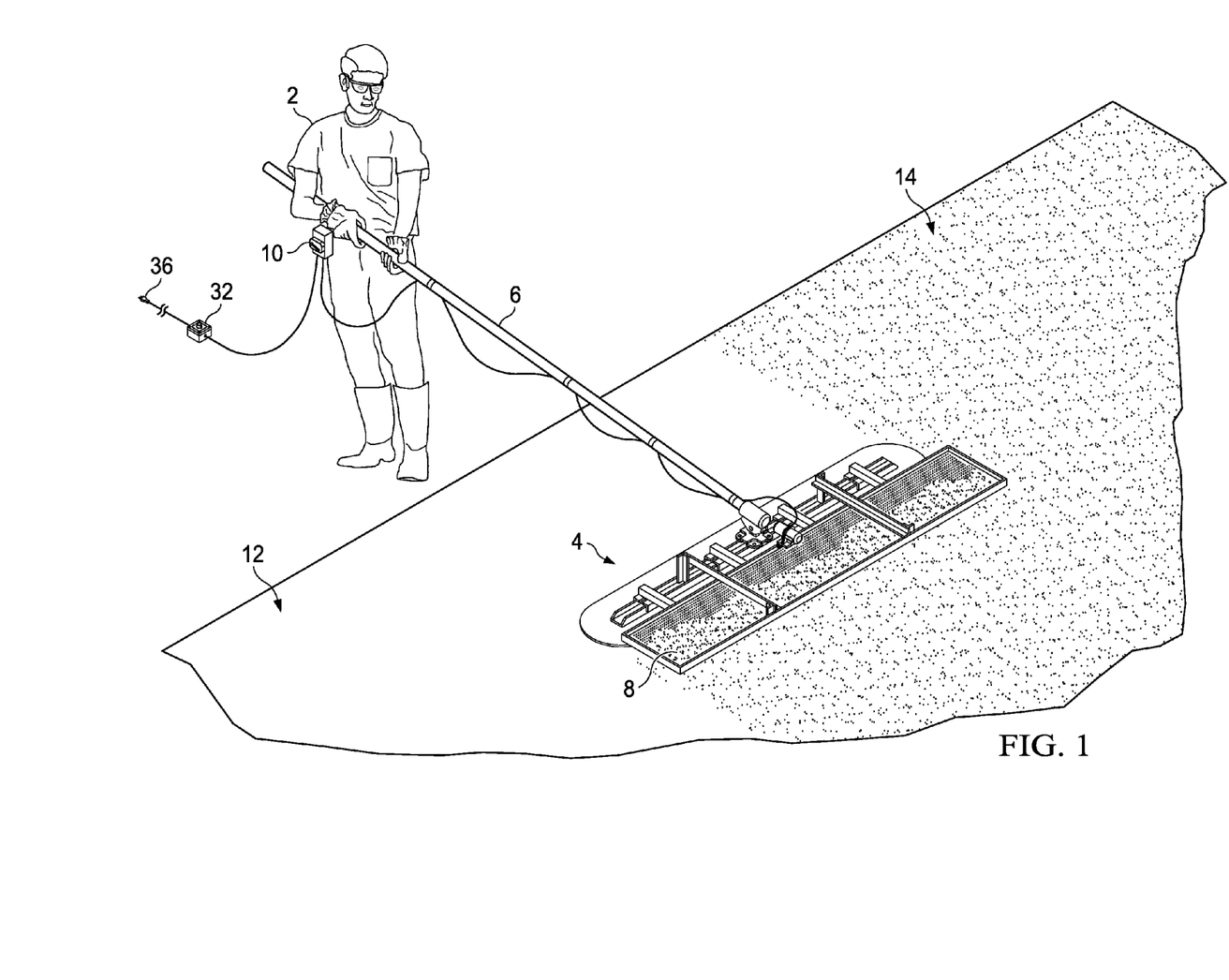
FIG. 1 is a perspective view of the broadcast float tool assembly apparatus as used in a typical concrete finishing operation in accordance with the present invention.

FIG. 1 depicts a user (2) operating the broadcast float device (4) on a typical concrete surface (12) finishing job. As will be described in further detail hereafter, the broadcast float assembly (4) is operated by user (2) manipulating an extendible pole (6) that is detachably secured to the broadcast float assembly (4). Color hardener or other additive (8), which may be in granular, powder, or pelletized form, is added to and suspended above the concrete surface by the broadcaster assembly (4) then dispersed (or dispensed) on to the concrete slab (12) from the broadcast assembly (4) by actuation of a variable speed vibratory source controlled by switch (10), which vibrates the broadcast assembly at the desired speed in such fashion as to disperse or broadcast the additive onto to the surface of concrete slab (12).

In one embodiment the switch (10) may detachably secured on or about the person of user (2) for example, clipped to the user's belt or suspended about the user (2) with a strap or button. This allows the user (2) to broadcast the color hardener (8) in areas on surface (12) as desired without the aid of additional persons. In another embodiment switch (10) may rest on the ground, along with variable control switch (32) or without, and may be controlled by the user (2) or a bystander as desired. As depicted in FIG. 1, the treated concrete surface (14) denotes the effect of the application of an additive (8) thereto in this case shown as a concrete colorant, while concrete surface (12) remains untreated with additive (8). In another embodiment, the switch (10) includes a variable speed switch (32) so as to allow the user (2) to adjust speed of vibratory cycles applied to the broadcast float assembly (4), thereby increasing or decreasing the amount of additive (8) that is dispersed or broadcast on to the concrete surface (12).

Figure 2:
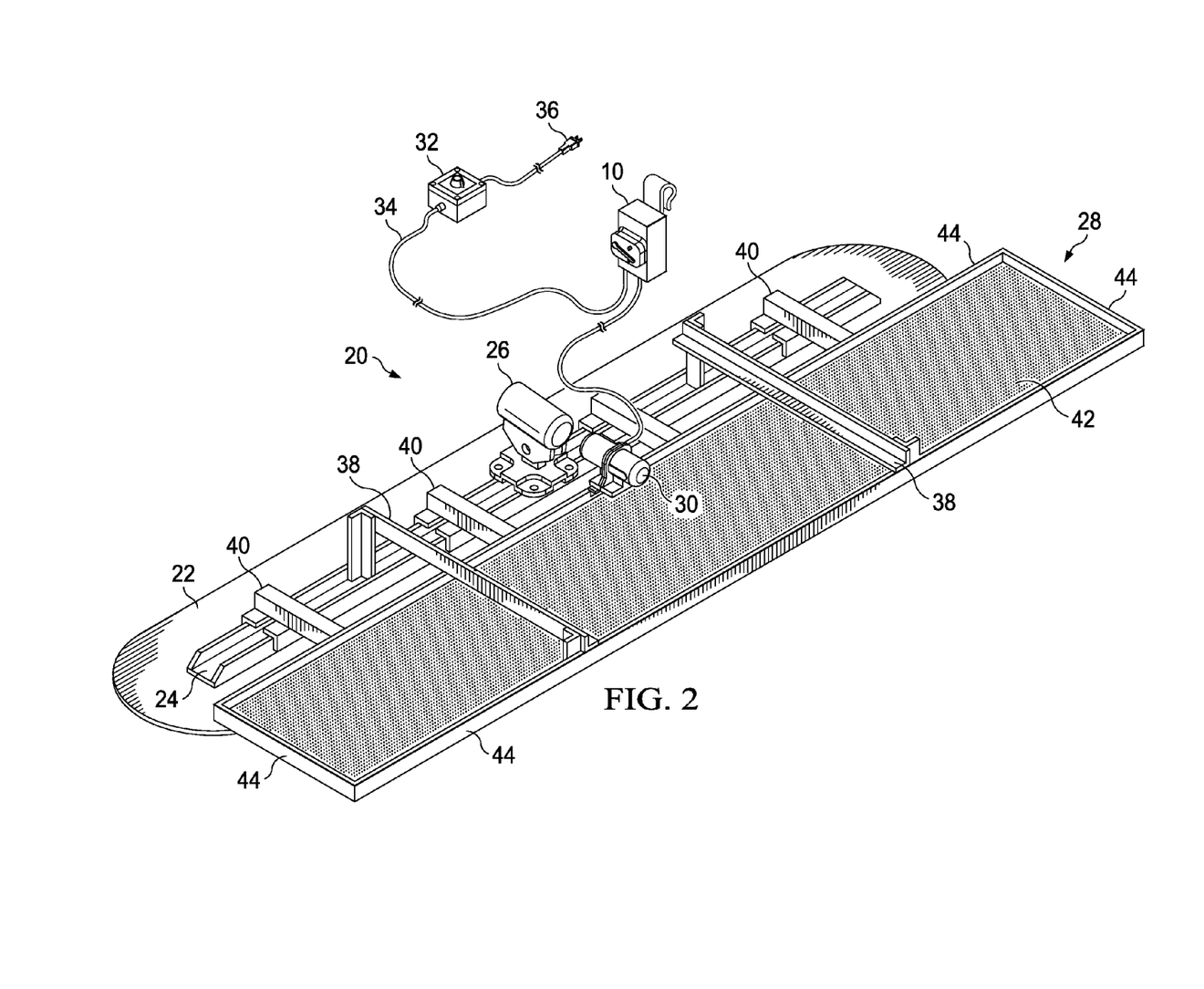
FIG. 2 is a close-up perspective view of the broadcast float assembly in accordance with the present invention.

Turning to FIG. 2, the broadcast float assembly (20) components are shown in greater detail. The broadcast float assembly (20) includes a float plate (22), a float plate mount bracket (24), a tool receiver (26), a broadcaster (28), and a vibratory source (30) with a controller switch (32) in electrical communication with the vibratory source (30) via cord (34). Electrical power is supplied to the control switch (32) and vibratory source (30) by connecting the plug (36) to an electric power source of appropriate voltage, which in typical applications is 110 volts-220 volts. In another embodiment, electrical power is supplied by battery, generator or other capacitance means as known in the art. For example, a 24 or 48 Volt battery pack would provide adequate power for operation of the device (4) when it is being used in locations where direct electrical power is not available or easily accessible. It is contemplated that in other embodiments the broadcast float assembly (20) may be used with or integrated with other floats, screeds, tampers or other concrete finishing equipment as known in the art.

The broadcaster (28) includes a screen (42) secured to a screen frame (44). The screen (42) is further comprised of a mesh or perforated metal or polymer screen wherein the mesh or perforation openings therein allow for additive flow through the screen (42) upon activation of the vibratory source (30), which imparts vibrations or shockwaves to the broadcaster (28) causing the passage of additive through the holes in screen (42). In one embodiment, the screen (42) is made of 0.050 gauge aluminum metal with $3/32$ inch diameter staggered holes punched therethrough. The screen frame (44) is also constructed of aluminum metal or other suitable structural material. The screen frame (44) supports the screen (42) and also provides a containment wall around the perimeter of the screen (42) for maintaining the quantity of additive poured on to the screen (42) surface in place and ready for application. In one embodiment, the screen frame (44) is made of aluminum metal tubing or channel of sufficient strength to contain and support screen (40) when loaded with additive for broadcast. In the embodiment shown, vibratory source (30) is attached to the broadcaster (28) by weld, bolt or other attachment means as known in the art.

The broadcaster (28) is secured to and supported by the float plate (22) via upper supports (38) and lower supports (40). The upper supports (38) and lower supports (40) are secured to the float plate (22) via the float plate mount bracket (24) by weld, bolt or other suitable attachment means as known in the art. Upper supports (38) and lower supports (40) are secured to the broadcaster (28) by weld, bolt or other suitable attachment means as known in the art. The vibratory source (30) is detachably secured to the broadcaster (28) by weld, bolt or other suitable attachment means as known in the art. The vibratory source (30) may be attached to the broadcaster (28) at any suitable attachment point and its position shown in the Figures herein is not to be construed as a limitation of the architecture disclosed herein.

Figure 3:
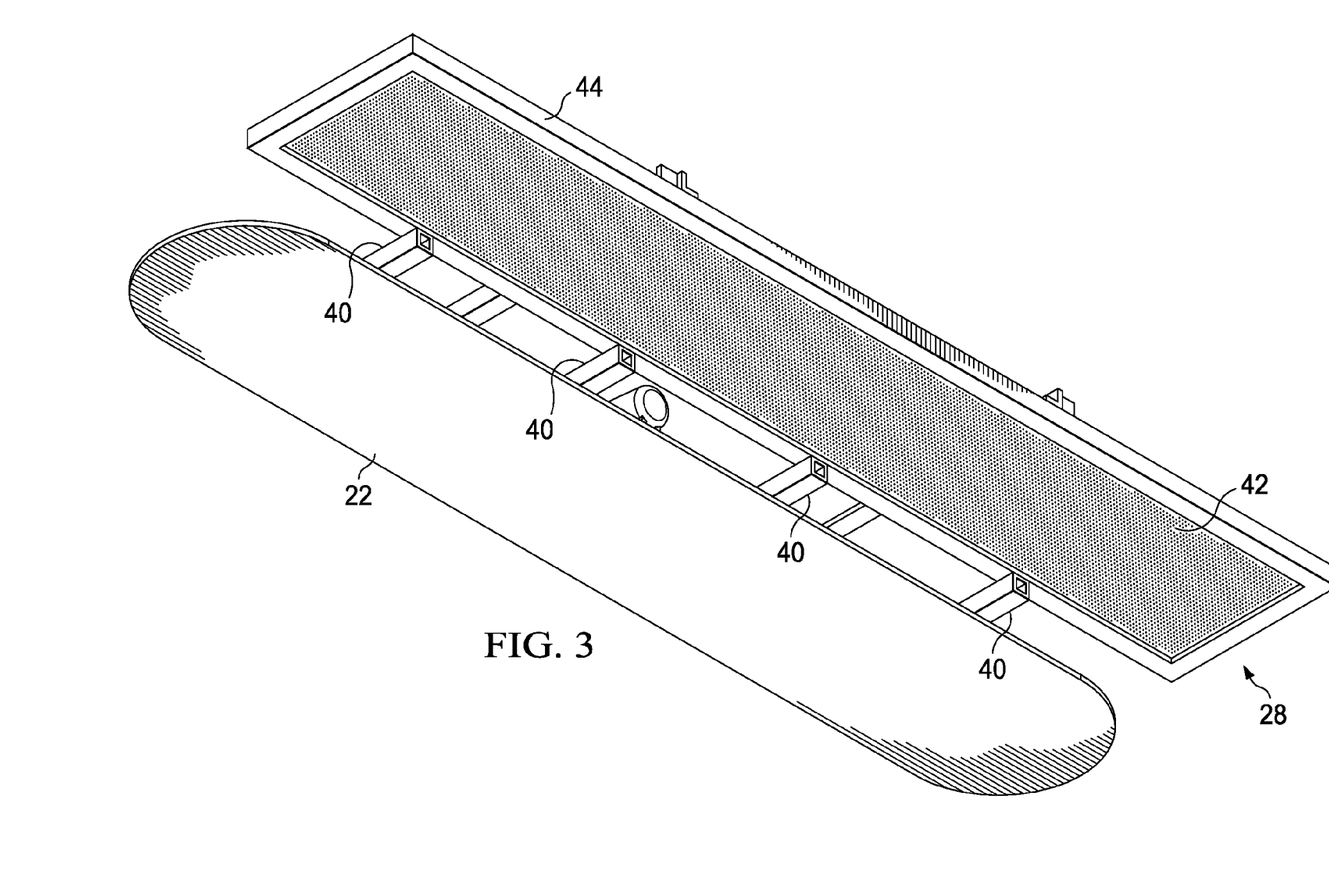
FIG. 3 is a bottom perspective view of the broadcast float assembly in accordance with the present invention.

With reference to FIG. 3, the broadcast float assembly is shown from a bottom perspective view. Lower supports (40) are depicted in greater detail and shown supporting the broadcaster (28) in the horizontal plane above the plane of the float plate (22). In one embodiment, the broadcaster (28) is suspended between approximately one to six inches above the horizontal float plate (22) plane. Various heights may be utilized depending on the desired broadcast range or the application or environmental conditions (wind conditions) prevailing at the time of additive broadcast. In one embodiment, the broadcaster (28) height above the float plate (22) is variable and may be adjusted by loosening/tightening bolts, screws, nuts or latching/unlatching pins located at the attachment points for the upper supports (38) and lower supports (40). It is contemplated that in alternative embodiments adjustable connections or connector means may be utilized to allow the operator to adjust the height of the broadcaster (28) relative to the float plate (22) as desired.

Figure 4:
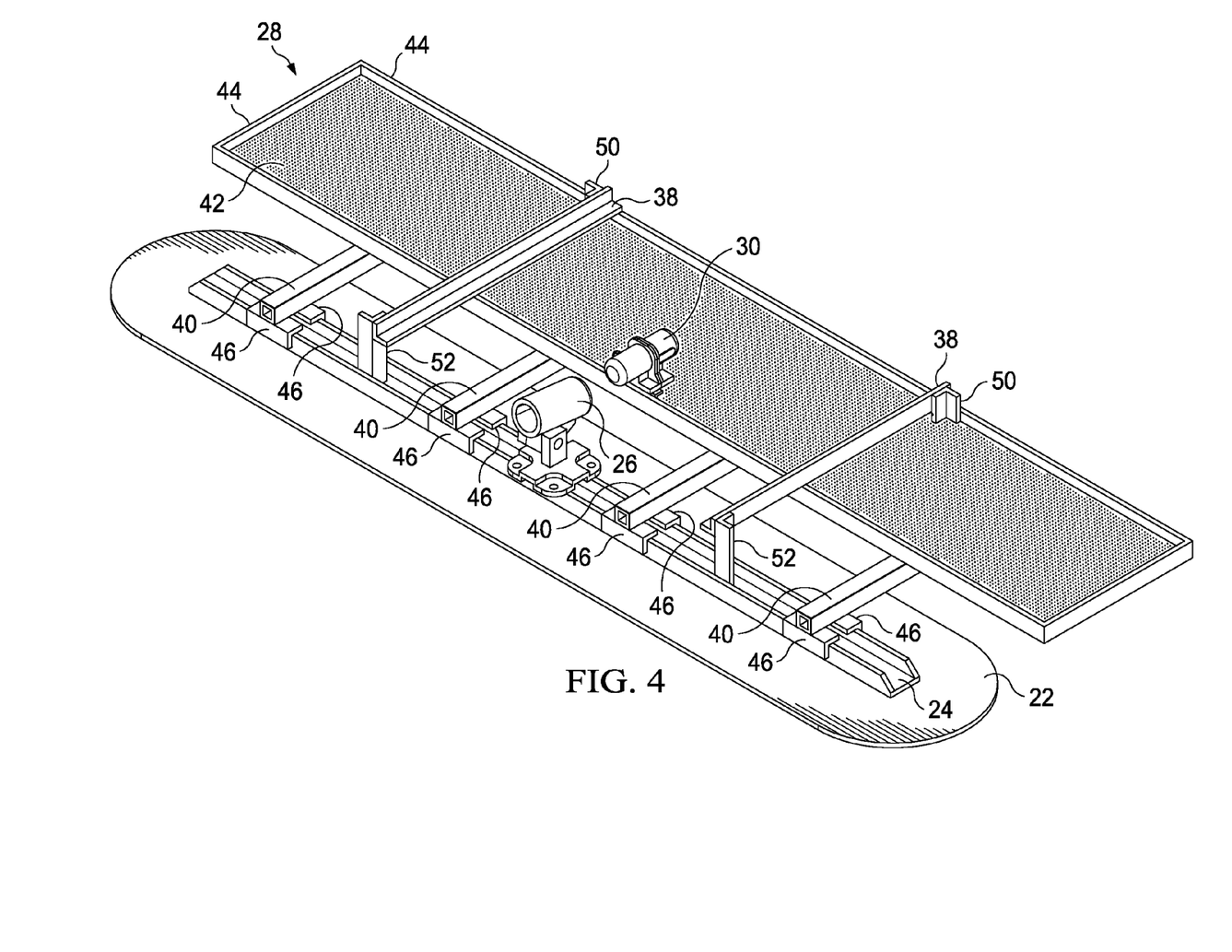
FIG. 4 is a rear perspective view of the broadcast float assembly in accordance with the present invention.

Turning to FIG. 4, a rear perspective view of the broadcast float apparatus is depicted. In this embodiment, four lower supports (40) are shown with two upper supports (38) shown extending across the top portion of the broadcaster (28). Upper supports (38) are shown attached to the broadcaster (28) via channel supports (50), which are secured to the screen wall (44) and to the float plate mount bracket (24) via the channel supports (52). The lower supports (40) are shown attached to the float plate mount bracket via channel supports (46). Channel supports (46; 50) may optionally be fashioned out of metal or other structurally sufficient materials in various shapes such as tubing, channel, rod or other geometric shapes capable of providing sufficient support for the broadcaster (28) to the float plate (22).

In this embodiment, the vibratory source (30) is comprised of an electric motor with offset weights attached to a driveshaft dispensed therein so as to provide a source of vibrations or shock waves sufficient to induce the flow of additive resting on the top surface of screen (42) through the perforations in the screen (42) and onto the concrete surface being finished. A variable speed vibratory device may be utilized with the vibratory cycle speed controlled by the user via the control switch or a variable speed switch or both. As the cycle speed is increased, the amount of color hardener or additive broadcast increases, thereby resulting in a higher concentration of additive being applied to the concrete surface. As the vibratory cycle speed is lowered, smaller volumes of color hardener or additive are dispersed resulting in lower concentrations being applied to the concrete surface.

Figure 5:
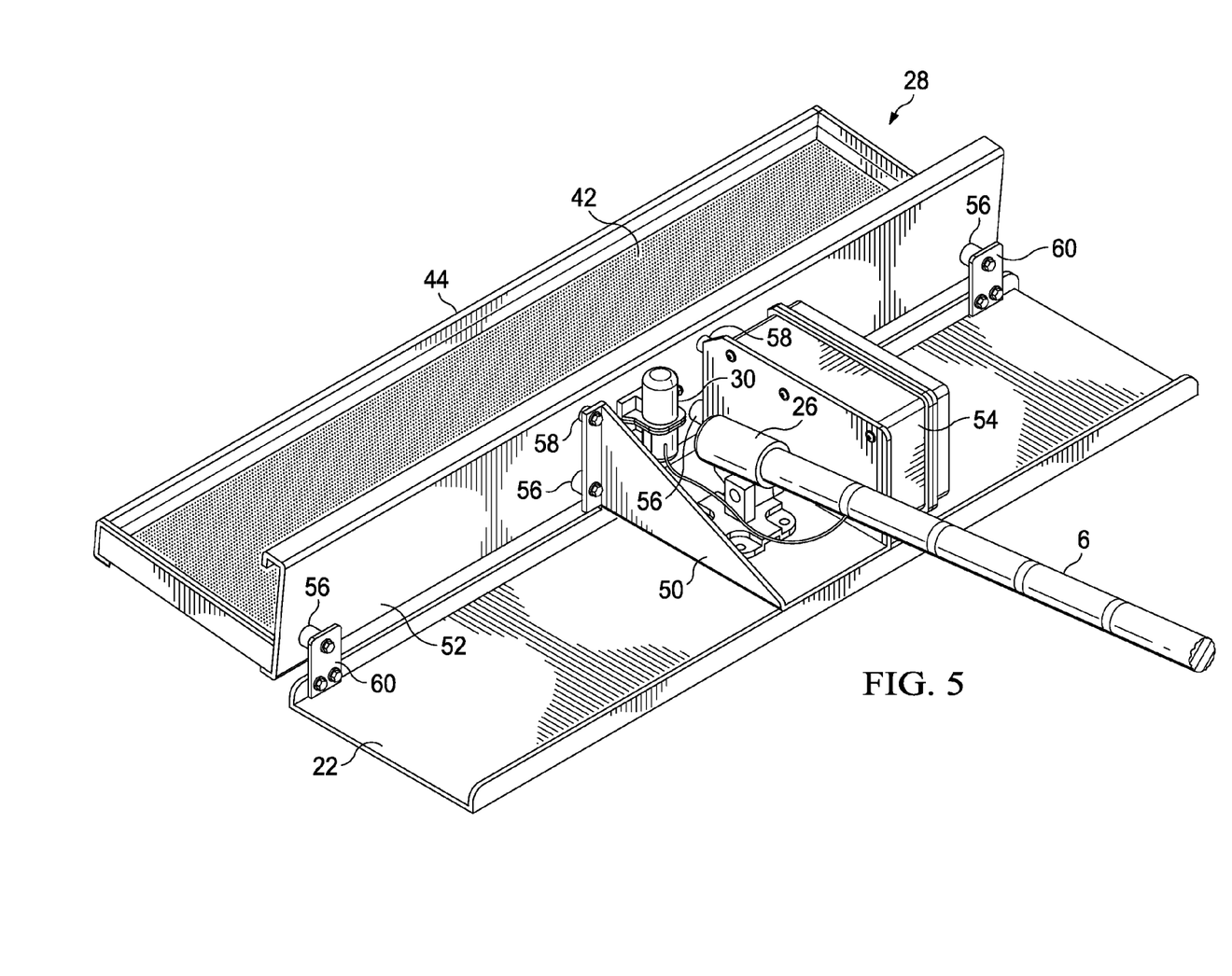
FIG. 5 is a rear perspective view of an additional embodiment of the broadcast float assembly.

Turning to FIG. 5, a rear perspective view of an additional embodiment of the broadcast float apparatus is depicted. In this embodiment, the float plate (22) includes an inner support bracket (50) attached to the back support (52) of the broadcaster (28). A tool receiver (26) is attached to the support bracket (50) to accept tools (for example, an extendible pole or joinable pole sections) to enable operator manual control of the float plate. A vibratory source (30) is also attached to the back support (52) of the broadcaster (28). Attached to one side of the inner support bracket (50) is a controller box (54) that houses the drive circuitry for the vibratory source (30).

The broadcaster (28) in this embodiment also includes a screen (42) secured to a screen frame (44). The screen (42) is further comprised of a mesh or perforated metal or polymer screen wherein the mesh or perforation openings therein allow for additive flow through the screen (42) upon activation of the vibratory source (30). The screen (42) perforations are adequately sized such that the additive contained thereon remains substantially in place when the vibratory source (30) is inactive. As before, varying the vibratory source speed varies the rate at which the additive is dispensed through the perforations.

In this embodiment the vibratory source (30) is in electrical communication with the controller box (54) circuitry. Electrical power applied to the controller circuitry activates the vibratory source (30) to vibrate the broadcaster (28). The vibratory source (30) may be fixed speed or variable speed, depending on the operator requirements. If fixed speed, the operator may utilize a simple on/off switch to activate the vibratory source. This on/off switch may be mounted on the controller box (54) or, in another embodiment, may be remotely mounted. For example, the remote switch may be worn on the operator's belt or wristband. If worn on the operator, the operator is said to be in electrical communication with the controller circuitry, which is in electrical communication with the vibratory source (30).

The broadcaster (28) in this embodiment attaches to the float plate (22) by way of vibration damper devices (56, 58). The benefit of use of vibration damper devices (56, 58) is that float plate (22) is substantially isolated from the vibrations of the broadcaster (28). This prevents the float plate (22) from moving excessively with respect to the horizontal surface upon which it is supported. For example, one use of the device is to dispense additive onto the surface of uncured cement. An operator imparts physical force upon a tool attached to the tool receiver (26) and moves the float plate (22) in a forward (away from the operator) and/or a backward (toward the operator) direction, with the float plate (22) gliding on the "wet" concrete surface and the broadcaster (28) dispensing the additive. If the float plate (22) experiences excessive vibratory motion, then the "wet" concrete surface may be disturbed by the float plate (22), which may adversely affect the smoothness or finish of the surface. Use of vibration damper devices (56, 58) substantially minimizes or even eliminates this excessive, unwanted motion and disturbance of the concrete surface finish.

Although the depicted embodiment utilizes a plurality of vibration damper devices (56, 58) to attach the broadcaster (28) to the float plate (22) support bracket (50), other embodiments may instead utilize a single vibration damper device that effectively covers each of the mounting points. For example, the four vibration damper devices (56, 58) can be joined together as a single unit of vibration dampening material in either wedge or flat form such that the single vibration damper device spans the four depicted mounting posts. The increased mass of a single vibration damper device may provide added vibration dampening benefits to the overall design.

Figure 6:
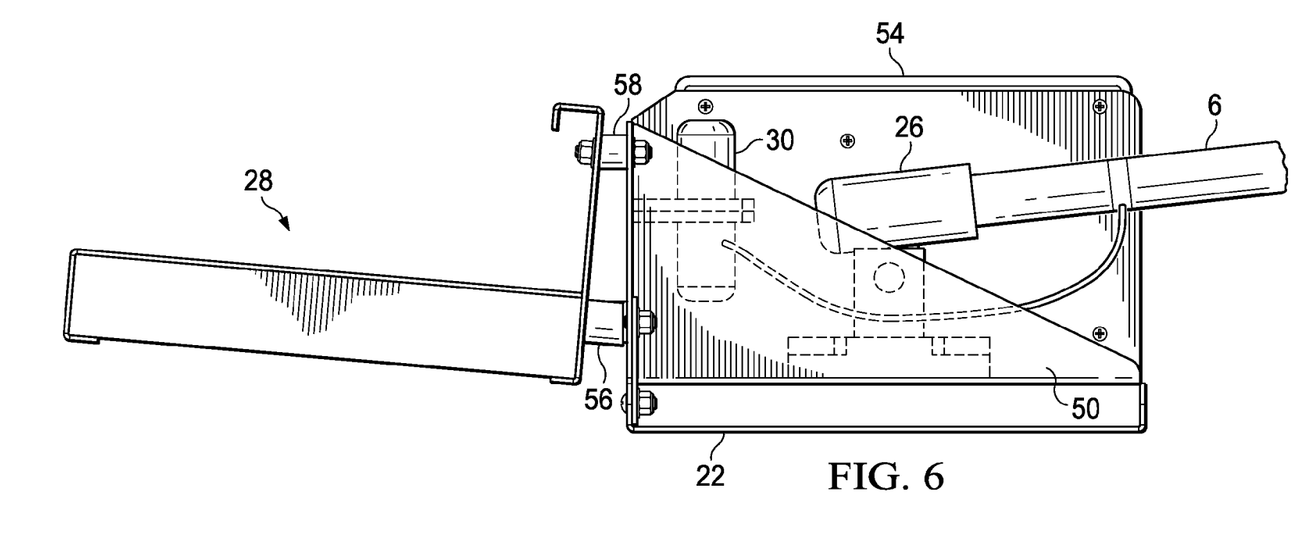
FIG. 6 is a side view of the additional embodiment highlighting arrangement of the broadcaster and float plate.

As shown, the broadcaster back support (52) is attached to the inner support bracket (50) by an upper vibration damper device (58) and a lower vibration damper device (56). In this embodiment the upper vibration damper device (58) is slightly smaller in length than the lower vibration damper device (56) to provide a slight rearward tilt to the broadcaster (28) tray. FIG. 6 depicts a side view of the apparatus highlighting this arrangement. This slight rearward tilt helps to prevent the broadcaster (28) from sagging (deflecting downward towards the horizontal surface) under the weight of the additive contained thereon. However, another embodiment utilizes equally sized vibration dampers and instead relies on the stiffness of the damper devices and broadcaster back support (52) to prevent sagging. One of ordinary skill in the art will appreciate that each vibration damper device (56, 58) is commercially available, and comprises two individual threaded studs separated by a rubber or polymer core (or a combination thereof).

Referring once again to FIG. 5, the depicted embodiment broadcaster (28) and float plate (22) measure approximately 48" in width. To prevent excessive rotational movement of the broadcaster (28) relative to the float plate (22), it is preferable to include an outer bracket (60) with an additional vibration damper device (56) on either outer edge of the float plate (22). In narrower embodiments this outer bracket may not be necessary, so long as the chosen material thicknesses are sufficient to prevent this excessive rotational movement. In yet another embodiment, the float plate (22) differs in width than the broadcaster (28). Still, in this configuration a sufficient quantity of vibration damper devices (56, 58) are utilized to minimize excessive rotational movement of the broadcaster (28).

As stated previously, an operator controls the movement of the apparatus by applying force to the float plate (22) through a tool attached to the tool receiver (26). This tool may be a rigid sectional or telescopic (locking) pole that allows the operator to stand clear of the horizontal surface being treated by the apparatus yet still cause the apparatus to move. Movement across or along the horizontal surface being treated may be cause by a pushing (away from operator), pulling (toward the operator), or sideways motion. This relatively easily repositionable apparatus allows additive to be selectively dispensed on any portion of the horizontal surface being treated.

In application and with reference to the figures herein described, a user can utilize the broadcast float apparatus to selectively apply additives to desired areas of a concrete slab that is being finished, by altering and/or stopping the vibratory source (30) during slab treatment. For example, a spotted color pattern could be easily colored into the concrete using the apparatus and method disclosed herein. Additionally, the apparatus (10) allows a user to apply color hardener or other additives in areas of a plastic slab where traditional "hand throwing" techniques could not be utilized or would not be effective. The operator may simply add the requisite number of tool extension poles to position the apparatus in the desired area for the broadcast of color hardener or other additives. Likewise, in other embodiments of the invention it may be desirable to use a plasticizer in select portions of the plastic slab being finished to alter or extend the curing time for a certain portion of the slab. This would facilitate light foot traffic on portions of the untreated slab and allow users to insert forms, columns or other objects in select areas of the slab that have remained in a plastic, essentially uncured state.

The invention may be embodied in other specific forms without departing from the spirit or essential characteristics thereof. The present embodiments are therefore to be considered in all respects as illustrative and not restrictive. Accordingly, the scope of the invention is established by the appended claims rather than by the foregoing description. All changes which come within the meaning and range of equivalency of the claims are therefore intended to be embraced therein. Further, the recitation of method steps does not denote a particular sequence for execution of the steps. Such method steps may therefore be performed in a sequence other than that recited unless the particular claim expressly states otherwise.

I claim:

1. An apparatus comprising:
   a float plate;
   an inner support bracket attached to a top side of the float plate;
   a tool receiver attached to the float plate;
   a broadcaster comprising a screen attached to a screen frame attached to a broadcaster back support with a vibratory source attached to the broadcaster back support, wherein the broadcaster back support is attached to the inner support bracket such that the horizontal plane of the lowermost surface of the broadcaster is positioned forward and above the horizontal plane of the lowermost surface of the float plate;
   at least one vibration damper device attaching the broadcaster to the float plate, wherein the vibration damper device substantially isolates the float plate from the vibration of the broadcaster caused by the vibratory source; and,
   wherein the broadcaster is operable to dispense an additive substantially contained thereon upon actuation of the vibratory source.

2. The apparatus of claim 1, the apparatus further comprising:
   a plurality of vibration damper devices attaching the broadcaster to the float plate, wherein the vibration damper devices substantially isolate the float plate from the vibration of the broadcaster caused by the vibratory source.

3. The apparatus of claim 1, the apparatus further comprising:
   a vibratory source controller in electrical communication with the vibratory source and further in electrical communication with an operator.

4. The apparatus of claim 1, the apparatus further comprising:
   a vibratory source controller in electrical communication with the vibratory source; and
   a control switch in electrical communication with the controller, the control switch worn about an operator's person.

5. The apparatus of claim 1, the broadcaster further including a base with a plurality of perforations through which the additive is dispensed.

6. The apparatus of claim 1 wherein the horizontal plane of the lowermost surface of the broadcaster is positioned between one and six inches above the lowermost surface of the horizontal plane of the float plate.

7. The apparatus of claim 1 wherein the vibratory source is a variable speed motor.

8. A method, comprising:
   providing a broadcaster float assembly in contact with a wet concrete surface with a float plate having an inner support bracket attached to the top side of the float plate;
   suspending a broadcaster including a broadcaster screen attached to a screen frame attached to a broadcaster back support, wherein the broadcaster back support is attached to the inner support bracket such that the horizontal plane of the lowermost surface of the broadcaster is positioned forward and above the horizontal plane of the lowermost surface of the float plate in contact with the surface, the broadcaster containing a quantity of additive for dispensing therefrom;

vibrating the broadcaster via a vibratory source attached to the broadcaster back support to dispense the additive onto the surface;

isolating the float plate from the broadcaster through use of at least one vibration damper device to substantially minimize the transference of vibrations from the broadcaster to the float plate; and, moving the broadcaster over the surface to effect the dispersion of additive thereon.

9. The method of claim 8, further comprising:

allowing an operator to effect movement of the broadcaster device by accepting pushing or pulling forces at the float plate.

10. The method of claim 8, further comprising:

varying the intensity of vibration of the broadcaster to vary the dispensing rate of the additive.

11. The method of claim 8, further comprising:

varying the intensity of vibration of the broadcaster device to vary the dispensing rate of the additive; and, producing a visually perceptible pattern of additive on the surface.

\* \* \* \* \*

UNITED STATES PATENT AND TRADEMARK OFFICE
CERTIFICATE OF CORRECTION

| | | Page 1 of 1 |
|---|---|---|
| PATENT NO. | : 8,714,873 B2 | |
| APPLICATION NO. | : 13/461362 | |
| DATED | : May 6, 2014 | |
| INVENTOR(S) | : John Scott Stephens | |

It is certified that error appears in the above-identified patent and that said Letters Patent is hereby corrected as shown below:

IN THE CLAIMS

Col. 9, Claim 10   Line 15    change "broadcaster to vary" to --broadcaster device to vary--

Signed and Sealed this
Eighth Day of July, 2014

Michelle K. Lee
*Deputy Director of the United States Patent and Trademark Office*